United States Patent
Zhao et al.

(10) Patent No.: US 12,381,286 B2
(45) Date of Patent: Aug. 5, 2025

(54) IONIC LIQUID/POLYMER COMPOSITE FILM, AND PREPARATION METHOD THEREFOR AND USE THEREOF

(71) Applicant: HUAZHONG UNIVERSITY OF SCIENCE AND TECHNOLOGY, Hubei (CN)

(72) Inventors: Long Zhao, Hubei (CN); Yifei Song, Hubei (CN); Zhiguo Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 19/063,185

(22) Filed: Feb. 25, 2025

(65) Prior Publication Data

US 2025/0202041 A1 Jun. 19, 2025

Related U.S. Application Data

(63) Continuation of application No. PCT/CN2023/118749, filed on Sep. 14, 2023.

(30) Foreign Application Priority Data

Sep. 14, 2022 (CN) .......................... 202211116805.3

(51) Int. Cl.
*H01M 50/406* (2021.01)
*C08J 5/22* (2006.01)
(Continued)

(52) U.S. Cl.
CPC .......... *H01M 50/406* (2021.01); *C08J 5/2256* (2013.01); *C08J 5/2287* (2013.01);
(Continued)

(58) Field of Classification Search
CPC .. H01M 8/103; H01M 8/1044; H01M 8/1072; H01M 50/414;
(Continued)

(56) References Cited

U.S. PATENT DOCUMENTS

2011/0311881 A1 12/2011 Benicewicz

FOREIGN PATENT DOCUMENTS

| CN | 106750441 | 5/2017 | |
|---|---|---|---|
| CN | 106887629 A * | 6/2017 | .......... H01M 8/1027 |

(Continued)

OTHER PUBLICATIONS

Partial machine translation of CN-106887629-A (Year: 2017).*
(Continued)

*Primary Examiner* — Kregg T Brooks
(74) *Attorney, Agent, or Firm* — JCIPRNET (57) ABSTRACT

Disclosed is a preparation method for an ionic liquid/polymer composite film including uniformly mixing a base material with an unsaturated double bond-containing ionic liquid solution by a good solvent to obtain a casting solution, wherein the base material includes at least one of polybenzimidazole and a polybenzimidazole derivative; flatly laying the casting solution on a substrate, and drying to remove the solvent to obtain a solid film; and performing ionizing radiation on the solid film to generate polymerization/cross-linking by inducing induce the ionic liquid and entangle a polyionic liquid molecular chain with a polymer molecular chain in the base material to fix the ionic liquid in the base material to form a composite film. An ionic liquid/polymer composite film and an application thereof is also disclosed.

8 Claims, 4 Drawing Sheets

(51) Int. Cl.
*H01M 8/103* (2016.01)
*H01M 8/1044* (2016.01)
*H01M 8/1072* (2016.01)
*H01M 50/411* (2021.01)
*H01M 50/414* (2021.01)
*H01M 50/431* (2021.01)
*H01M 50/443* (2021.01)
*H01M 50/446* (2021.01)

(52) U.S. Cl.
CPC .......... *H01M 8/103* (2013.01); *H01M 8/1044* (2013.01); *H01M 8/1072* (2013.01); *H01M 50/411* (2021.01); *H01M 50/414* (2021.01); *H01M 50/431* (2021.01); *H01M 50/443* (2021.01); *H01M 50/446* (2021.01); *C08J 2379/04* (2013.01)

(58) Field of Classification Search
CPC .......... C08J 5/2206–2268; C08J 5/2287; C08J 5/2293; C08J 2379/04
See application file for complete search history.

(56) References Cited

FOREIGN PATENT DOCUMENTS

| | | |
|---|---|---|
| CN | 107248583 | 10/2017 |
| CN | 107417942 | 12/2017 |
| CN | 106558717 | 5/2019 |
| CN | 115513505 | 12/2022 |

OTHER PUBLICATIONS

Lin, "Thermoplastic Interpenetrating Polymer Networks based on Polybenzimidazole for Anion Exchange Membranes," Master's thesis, Jun. 2017, Chemical Engineering, Dalian University of Technology.

"International Search Report (Form PCT/ISA/210) of PCT/CN2023/118749," mailed on Nov. 9, 2023, with English translation thereof, pp. 1-7.

"Written Opinion of the International Searching Authority (Form PCT/ISA/237) of PCT/CN2023/118749," mailed on Nov. 9, 2023, with English translation thereof, pp. 1-10.

\* cited by examiner

IONIC LIQUID/POLYMER COMPOSITE FILM, AND PREPARATION METHOD THEREFOR AND USE THEREOF

CROSS-REFERENCE TO RELATED APPLICATION

This application is a continuation of international application of PCT application serial no. PCT/CN2023/118749, filed on Sep. 14, 2023, which claims the priority benefit of China application no. 202211116805.3, filed on Sep. 14, 2022. The entirety of each of the above-mentioned patent applications is hereby incorporated by reference herein and made a part of this specification.

TECHNICAL FIELD

The disclosure belongs to the field of battery separator technology, and specially relates to an ionic liquid/polymer composite film and a preparation method therefor and a use thereof.

RELATED ART

In a battery of an electrochemical device, a film is a key assembly which separates an electrolyte and serves as a conductive discharge carrier to complete an internal circuit. Properties of an ion exchange film affect performance and cost of a battery system. An inexpensive, durable, highly conductive, and low-permeability ionic exchange film may greatly improve the performance of the battery and reduce the cost of the battery.

Compared with a commercial Nafion separator, a film based on polybenzimidazole (PBI) has extremely low vanadium permeability after acidification due to a structural characteristic thereof, and also possesses excellent chemical stability and mechanical strength. However, due to an inherent dense structure of PBI and the Donnan effect after acidification, the proton transport efficiency is extremely low. Therefore, the modification of a PBI film mainly focuses on improving proton transport capability. An ionic liquid is a kind of room temperature molten salt having attracted widespread attention in recent years in the field of fuel cell and vanadium flow battery separator due to excellent electrochemical performance. The researcher has constructed a proton transport channel by the ionic liquid, which may improve the conductivity of the ionic exchange film through the Grotthuss mechanism and vehicle transfer mechanism. However, current research has found that the binding force between an ionic liquid monomer and PBI is relatively weak, leading to the leakage of the ionic liquid during use, which affects the practical lifespan and use efficiency of the ionic exchange film.

CN106558717B discloses a high-temperature composite proton exchange film for fuel cells and a preparation method therefor. PBI and an ionic liquid are directly dissolved in an organic solvent to obtain a mixed solution, and then a casting method is used to form a film, resulting in a high-temperature composite proton exchange film for fuel cells. However, the formed ionic liquid/polymer film system is unstable, and the ionic liquid may leak easily.

CN107248583A discloses a polybenzimidazole-polyionic liquid cross-linked composite high-temperature proton exchange film and a preparation method therefor. A cross-linking agent is added to a mixed solution of PBI and imidazole-type polyionic liquid derived from PBI, and then a cross-linking reaction is induced at high temperature to introduce a polyionic liquid structure into a fluorine-containing polybenzimidazole polymer matrix. The method binds the polyionic liquid to the polymer through covalent cross-linking, thereby preventing the loss of ionic liquid.

Unlike base materials such as PVDF, due to the high radiation stability of PBI and a PBI derivative, which do not easily generate free radicals, those skilled in the art generally may not immobilize the polyionic liquid onto PBI through radiation grafting technology. Currently, there are no successful reports of using ionizing radiation technology to covalently bond an unsaturated double-bond containing ionic liquid to PBI through graft polymerization. Existing technologies have various limitations; therefore, there is a need to develop a preparation method for an ionic liquid/PBI polymer composite ionic exchange film that is simple to prepare, low in cost, excellent in performance, and structurally stable with high ionic liquid retention.

SUMMARY OF INVENTION

In view of the above deficiencies or improvement requirements of the related art, the disclosure provides an ionic liquid/polymer composite film and a preparation method therefor and a use thereof. A purpose of the disclosure is to provide a polyionic liquid/polymer composite film and a preparation method thereof that is simple to operate, suitable for industrial production, and has excellent performance.

To achieve the above purposes, according to an aspect of the disclosure, a preparation method for an ionic liquid/polymer composite film is provided, which includes: uniformly mixing a polymer base material with an unsaturated double bond-containing ionic liquid solution monomer by a good solvent to obtain a casting solution, wherein the polymer base material includes at least one of polybenzimidazole (PBI) and a PBI derivative; flatly laying the casting solution on a substrate, and drying to remove the solvent to obtain a solid film; performing ionizing radiation on the solid-state film, utilizing the ionizing radiation to induce the ionic liquid monomer to form a polyionic liquid and a cross-linked product thereof in the base material, and generating a physical entanglement effect between a polyionic liquid molecular chain and a base material molecular chain to fix an ionic liquid component in the polymer base material to form a composite film.

In an embodiment, the preparation method for the ionic liquid/polymer composite film further includes: washing and protonating the irradiated solid-state film to form an ionic liquid/polymer composite ionic exchange film.

In an embodiment, the PBI derivative is at least one of poly[2,2'-(p-oxydiphenylene)-5,5'-benzimidazole], poly[2,2'-(p-sulfonyldiphenylene)-5,5'-benzimidazole], poly[2,5-benzimidazole], and fluorine-containing polybenzimidazole.

In an embodiment, an anion of the ionic liquid monomer is at least one of tetrafluoroborate, bromide ion, chloride ion, or nitrate ion, and a cation of the ionic liquid monomer is double bond-containing vinyl imidazolium or allyl imidazolium.

In an embodiment, a mass of the ionic liquid monomer may be 10 to 200% of a mass of the base material, preferably 50% to 100%.

In an embodiment, the good solvent includes at least one of N,N-dimethylformamide, N,N-dimethylacetamide, dimethyl sulfoxide, and N-methyl pyrrolidone.

In an embodiment, the base material is further mixed with an inorganic nanoparticle, and the inorganic nanoparticle includes at least one of graphene, mesoporous carbon, functionalized carbon nanotube, and two-dimensional transition metal carbide/nitride.

In an embodiment, the ionizing radiation is any one of gamma ray radiation, electron beam radiation, or X-ray radiation, and an irradiation dose range of the ionizing radiation is 10 kGy to 300 kGy, preferably 80 kGy to 200 kGy.

According to another aspect of the disclosure, an ionic liquid/polymer composite film is provided, including a polymer base material and a polyionic liquid and a cross-linked structure thereof fixed in the base material by an entanglement effect on a base material molecular chain, where the polymer base material includes at least one of PBI and a PBI derivative, and the polyionic liquid is polymerized from an unsaturated double bond-containing ionic liquid monomer.

According to another aspect of the disclosure, a use of an ionic liquid/polymer composite film is provided. The aforementioned ionic liquid/polymer composite film is used as an electrolyte separator in an all-vanadium redox flow battery or a fuel cell.

Overall, compared with the related art, the technical solutions conceived by the disclosure may achieve the following beneficial effects.

Due to the high radiation stability of PBI and the PBI derivative, those skilled in the art would generally not consider fixing the unsaturated double bond-containing ionic liquid onto a PBI base material by using ionizing radiation technology. In the disclosure, the inventor first uniformly mixes the PBI base material and the unsaturated double bond-containing ionic liquid monomer by a solvent to obtain a casting solution, then flatly lays the casting solution to dry and remove the solvent to obtain a solid film. At this time, the ionic liquid monomer is uniformly dispersed in the base material. Afterwards, the ionizing irradiation is performed on the solid film. By experiment, it is found that the ionic liquid monomer dispersed in the base material polymerizes during the irradiation to form a cross-linked structure. Simultaneously, due to the uniform dispersion of the ionic liquid in the base material, a physical entanglement effect occurs between the polyionic liquid molecular chain and the base material polymer molecular chain to form a composite film. In this technical solution, the polyionic liquid, due to an increased molecular weight thereof, allows the ionic liquid component contained therein to more easily form a chemical bond with the polymer, or directly undergo molecular entanglement, resulting in a more stable structural property. Moreover, experiments have proven that the polyionic liquid in the obtained composite film is firmly bonded to the base material, and the ionic liquid is not prone to leakage. This disclosure breaks conventional thinking and solves the problem that the ionic liquid monomer and the PBI base material may not be directly graft polymerized and introduced by ionizing radiation technology. By first achieving uniformly mixing and film laying of the ionic liquid film and the base material in a co-solvent, and then performing the irradiation on the solid film, the polymerization/cross-linking of the ionic liquid is achieved, ultimately resulting in the physical entanglement effect on the polymer molecular chain in the base material to form a composite film. Compared to a solid-liquid grafting reaction or a liquid-liquid grafting reaction involving a liquid phase, the preparation for the composite film by using ionizing radiation technology in the solid state has a simpler and faster control process which is more suitable for industrial-scale production, and has prospects for industrial use.

DESCRIPTION OF EMBODIMENTS

In order to make the purpose, technical solution, and advantages of the disclosure comprehensible, the following description provides further details of the disclosure in conjunction with the drawings and embodiments. It should be understood that the specific embodiments described here are only used to explain the disclosure and are not intended to limit the disclosure. Moreover, the technical features involved in various embodiments of the disclosure described below may be combined with each other as long as they do not conflict with each other.

Figure 1:
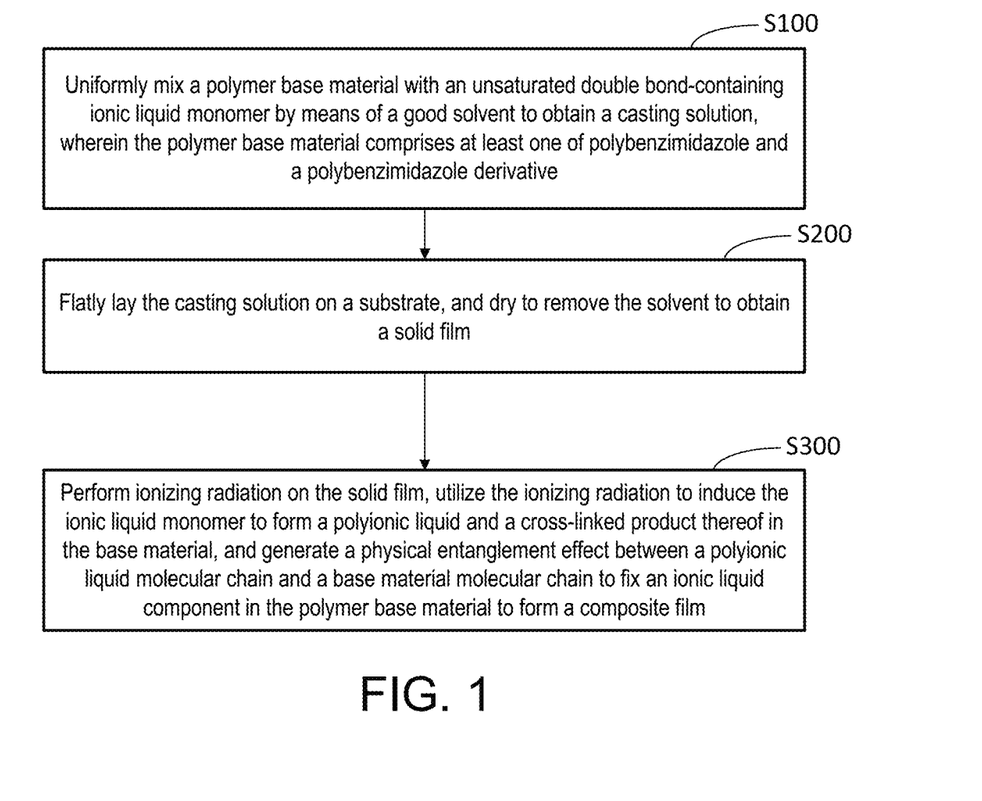
FIG. 1 is a flow chart of steps of a preparation method for an ionic liquid/polymer composite film in an embodiment.

As shown in FIG. 1, a preparation method for an ionic liquid/polymer composite film in an embodiment of the disclosure mainly includes the following steps.

Step S100: A polymer base material with an unsaturated double bond-containing ionic liquid monomer is uniformly mixed by means of a good solvent to obtain a casting solution. The polymer base material includes at least one of polybenzimidazole (PBI) and a PBI derivative.

Wherein, both the base material and the ionic liquid monomer are solids, and are dissolved together in the good solvent and mixed uniformly. The use amount of ionic liquid is 1% to 200% of a mass of the base material, preferably 50% to 100%.

Wherein, the base material may be selected to include PBI or a PBI derivative. Specifically, the PBI derivative may be chosen from at least one of poly[2,2'-(p-oxydiphenylene)-5,5'-benzimidazole](OPBI), poly[2,2'-(p-sulfonyldiphenylene)-5,5'-benzimidazole], poly[2,5-benzimidazole](ABPBI), fluorine-containing polybenzimidazole (6FPBI), or composites of the aforementioned PBI and PBI derivative with other polymer materials. PBI is preferably used as a base material.

Wherein, the ionic liquid monomer is a doping substance that needs to be fixed in the composite film and has inorganic anions and organic cations. A hydrophilic and unsaturated double bond-containing ionic liquid is often chosen, which may be opened and undergo a polymerization reaction during ionizing irradiation. Specifically, an anion of the ionic liquid monomer includes tetrafluoroborate ions, bromide ions, chloride ions, or nitrate ions, and a cation of the ionic liquid monomer includes double bond-containing vinyl or allyl imidazolium.

Wherein, the good solvent is a solvent which may dissolve the base material and the ionic liquid monomer, and may be removed during solidification and film formation. Specifically, an organic solvent may be chosen, such as N-methyl pyrrolidone or dimethyl sulfoxide or N, and N-dimethylformamide. The ionic liquid monomer is not undergo the polymerization reaction after dissolving in the good solvent. After subsequent ionizing irradiation, the ionic liquid monomer may polymerize on a large scale to form a polyionic liquid.

Step S200: The casting solution is flatly laid on a substrate, and dried to remove the solvent to obtain a solid film.

After the mixed casting solution is obtained, the casting solution is directly prepared into a film. Specifically, the casting method may be used to form a film by flow casting. After the solvent is removed by ultrasonic degassing and heat drying, a solid film is obtained. At this time, all materials are in a solid state, and no liquid substances exist. The ionic liquid monomer is dispersed in the base material. Specifically, a thickness of the solid film may be controlled to 10 to 200 µm, preferably 10 to 50 µm.

Step S300: Ionizing radiation is performed on the solid film and utilized to induce the ionic liquid monomer to form a polyionic liquid and a cross-linked product thereof in the base material. Moreover, a physical entanglement effect is generated between a polyionic liquid molecular chain and a base material molecular chain to fix an ionic liquid component in the polymer base material to form a composite film Under conventional understanding, PBI and the PBI derivative have high stability in radiation, and those skilled in the art generally do not consider fixing the unsaturated double bond-containing ionic liquid onto a PBI base material by using ionizing radiation technology. In the disclosure, it is discovered that the ionic liquid monomer inside the solid film undergoes the polymerization reaction during the ionizing irradiation. Therefore, in the disclosure, by executing step S300, the ionizing irradiation is performed on the solidified and film-formed solid film, causing the ionic liquid monomer dispersed in the base material to polymerize and form a polyionic liquid (PIL) and a cross-linked structure thereof. An entanglement effect between the PIL and the polymer molecular chain in the base material, as well as the cross-linked structure of the PIL, achieves the fixation of the ionic liquid.

Figure 2:
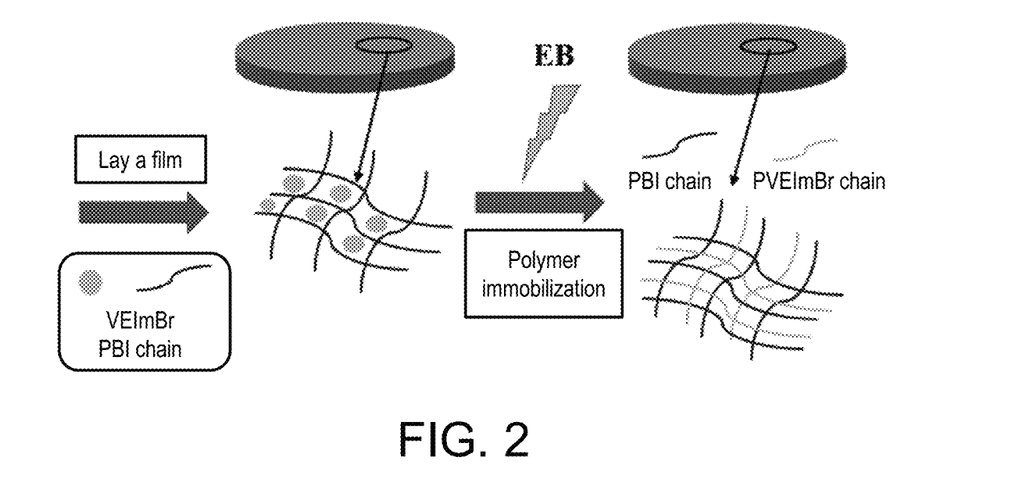
FIG. 2 is a schematic diagram illustrating an entanglement between a polyionic liquid (PIL) and a base material after irradiation in an embodiment.

Specifically, as shown in FIG. 2, after step S200 of laying the film, the solid film contains a PBI polymer molecular chain and a VEImBr ionic liquid monomer dispersed in the PBI polymer molecular chain. After subsequent ionizing radiation EB, the VEImBr ionic liquid monomer polymerized to form PIL PVEImBr. The PVEImBr chain and the PBI polymer molecular chain entangle with each other, fixing PIL in the base material, which prevents PIL from leaking out of the composite film.

In an embodiment, the ionizing radiation may be chosen from gamma ray radiation, electron beam radiation, or X-ray radiation. An irradiation dose of the ionizing radiation may be 10 kGy to 300 kGy, preferably 80 kGy to 200 kGy. If the irradiation dose is too high, the structure of the material may be damaged and the performance of the material may be affected. While if the irradiation dose is too low, it may be difficult for the ionic liquid monomer to polymerize.

Figure 3:
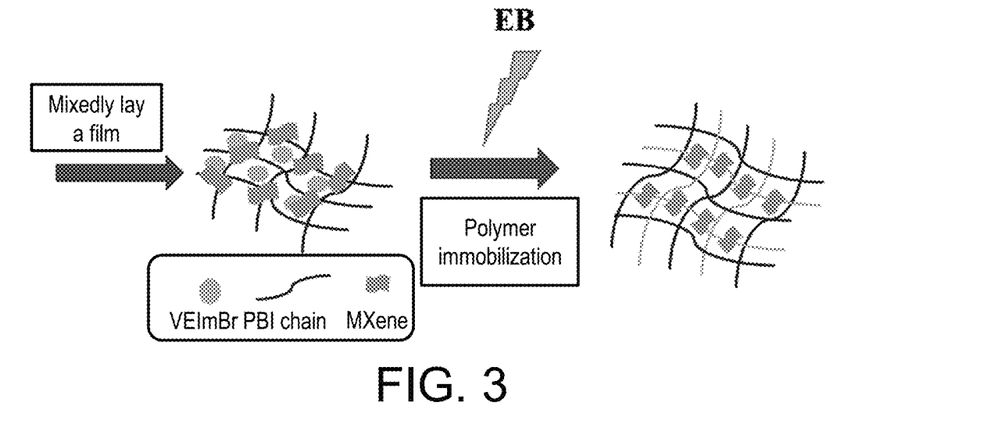
FIG. 3 is a schematic diagram of a structure of a composite film after adding nanoparticles in an embodiment.

In an embodiment, in step S100, an inorganic nanoparticle may be added to the casting solution, that is, the base material, the ionic liquid monomer, and the inorganic nanoparticle are dissolved together in the good solvent. After the nanoparticle is added, during the irradiation, the ionic liquid also encapsulates and fixes the doped conductive nanoparticles while undergoing cross-linking and entanglement, further improving the electrochemical performance of the composite film. As shown in FIG. 3, after step S200 of laying the film, the solid film has the PBI polymer molecular chain, as well as the VEImBr ionic liquid monomer and an MXene nanoparticle dispersed in the PBI polymer molecular chain. After subsequent ionizing radiation EB, polymerization occurs between the VEImBr ionic liquid monomer to ultimately generate an MXene-doped modified PBI/PIL composite film based on the PBI/PIL composite film. On one hand, the leakage of the ionic liquid is further reduced, and on the other hand, the electrochemical performance of the composite film is improved through the properties of the nanomaterial. Specifically, the nanoparticle may be chosen from materials such as graphene, mesoporous carbon, functionalized carbon nanotubes, and two-dimensional transition metal carbides/nitrides.

In the above preparation method for the ionic liquid/polymer composite film, the raw materials are first uniformly mixed by a solvent, then are laid and solidified into a film, so that the ionic liquid monomer is dispersed in the base material. Finally, the ionic liquid monomer undergoes the polymerization reaction by the ionizing radiation. The molecular chain of the PIL and the base material entangle with each other, thereby achieving fixation of the ionic liquid. Each step of the above method is interrelated, with the various steps working synergistically to ultimately obtain a composite film with stable performance, effectively preventing leakage of the ionic liquid. Moreover, the ionizing radiation technology proposed by the disclosure achieves the preparation for the composite film in the solid state, which is simpler to control and more conducive to large-scale industrial production.

Correspondingly, the disclosure further relates to an ionic liquid/polymer composite film, which may be specifically obtained through the aforementioned method. The composite film includes a base material and PIL and a cross-linked structure thereof fixed in the base material through entanglement effect on the polymer molecular chain in the base material. PIL is polymerized from the ionic liquid monomer. The selection of materials for the base material and ionic liquid monomer refers to the aforementioned introduction, which is not repeated here. In an embodiment, the PIL/polymer composite film further includes nanoparticles, which may be fixed in the PIL/polymer composite film after irradiation to improve the conductivity of the film.

Correspondingly, the disclosure further mentions use of the ionic liquid/polymer composite film. The ionic liquid/polymer composite film introduced above is protonated and then used as an electrolyte separator in all-vanadium redox flow batteries or fuel cells. Since the ionic liquid in the ionic liquid/polymer composite ionic exchange film is firmly bonded to the base material through entanglement, the ionic liquid is not prone to leakage in the electrolyte, which greatly improves the performance of the battery.

Specific embodiments are described as follows.

Example 1

(1) 0.5 g of PBI and 0.5 g of 1-vinyl-3-ethyl-imidazolium bromide were placed in a 25 mL beaker, then 9 g of N, N-dimethylacetamide was added and stirred at 60° C. for 24 hours to form a casting solution with a mass of 5%. After bubbles were removed by ultrasonication for 1 hour, the casting solution was poured onto a clean glass plate, left to stand for 5 to 10 minutes, and then dried at 60° C. for 24 hours to form a film.

(2) The solid film from step (1) was placed in a polyethylene bag, laid flatly, and then vacuum sealed and irradiated by electron beam with an absorbed dose of 80 kGy to obtain a composite film. The irradiated composite film was soaked in deionized water for 3 days to obtain a composite ionic exchange film.

(3) The performance of the composite ionic exchange film underwent a test.

Figure 4:
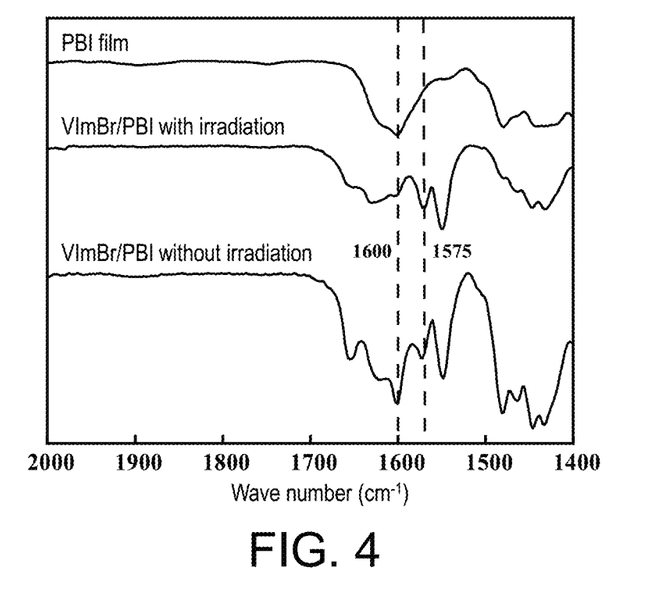
FIG. 4 shows the changes in absorption peaks in a range of 2000 to 1400 $cm^{-1}$ for PIL/PBI composite film before and after irradiation in Example 1.

To study the mechanism of cross-linking of PIL under an irradiation condition, a pure PBI film, a VImBr/PBI composite film obtained after irradiation in step (2), and a VImBr/PBI solid film without irradiation in step (2) underwent infrared tests, respectively, as shown in FIG. 4. After irradiation, the characteristic absorption peak of —C=C— at 1600 cm$^{-1}$ significantly decreases in amplitude, indicating that the unsaturated double bond-containing ionic liquid cross-linked after irradiation.

To compare the leakage of ionic liquid before and after irradiation, the composite films was soaked in 3 M sulfuric acid solution for 3 days. The retention rates of ionic liquid for composite films with two different ratios before and after irradiation were tested, and the results are shown in Table 1 below.

TABLE 1

Retention rates of ionic liquid for composite films with different ratios before and after irradiation.

| | Ionic liquid content of 50% | Ionic liquid content 100% |
|---|---|---|
| Ion liquid retention rate of composite film without irradiation/% | 26.85 | 41.86 |
| Ionic liquid retention rate of composite film with irradiation/% | 64.93 | 81.97 |

Wherein, the retention rate of the ionic liquid=1−(m1−m2)/m1×100%, m1 is a mass of the film before soaking, and m2 is the mass of the dried film after soaking. As shown in Table 1, when the ionic liquid content is 50% of the base material, the retention rate of ionic liquid for the composite film without irradiation is 26.85%, and when the absorbed dose is 160 kGy, the retention rate of ionic liquid is 64.93%; when the ionic liquid content is 100% of the base material, the retention rate of ionic liquid for the composite film without irradiation is 41.86%, and when the absorbed dose is 160 kGy, the retention rate of ionic liquid is 81.97%. The result indicates that the preparation method proposed by the disclosure may effectively improve the retention rate of the ionic liquid and reduce the leakage of the ionic liquid.

Figure 5:
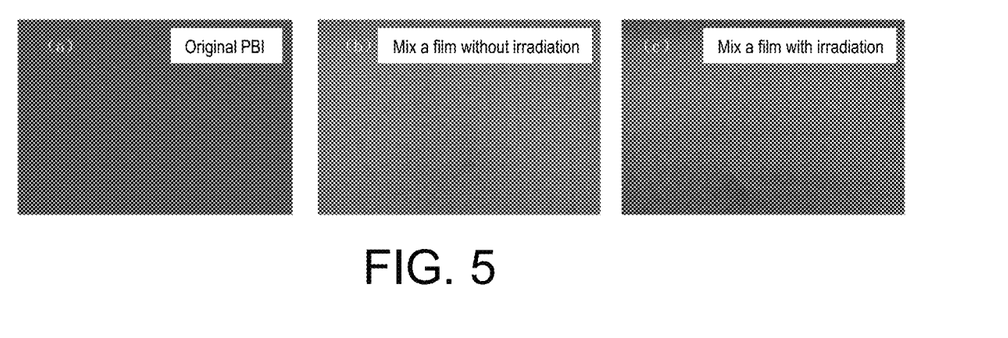
FIG. 5 shows SEM images of the microscopic morphology of composite films obtained under different conditions, where (a) is an SEM image of the microscopic morphology of PBI without adding PIL, (b) is an SEM image of the microscopic morphology of PIL/PBI composite film without irradiation, and (c) is an SEM image of the microscopic morphology of PIL/PBI composite film after irradiation in Example 1.

As shown in FIG. 5, the SEM image of the microscopic morphology of the composite film prepared in Example 1 indicates that the composite film is a homogeneous film, and the ionic liquid has good compatibility with PBI without phase separation occurring.

The conductivity test was performed on the composite film prepared in Example 1. A composite film with dimensions of 3 cm×1 cm was placed in 1M solution of $H_2SO_4$ for 24 hours, then the surface moisture thereof was wiped off and was placed on two copper plates 1 cm apart. After clamping, the AC impedance curve test was performed through an electrochemical workstation. Through calculation, the conductivity was obtained as 77.57 mS/cm, indicating that the composite film prepared by the disclosure has good conductivity.

Figure 6:
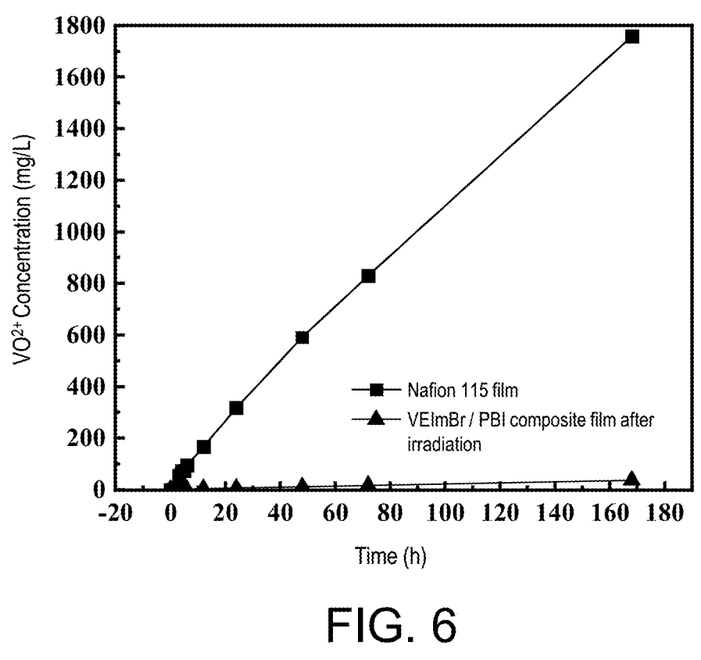
FIG. 6 is a comparison chart of vanadium permeability between the irradiated PIL/PBI composite film in Example 1 and a commercial Nafion 115 separator.

The vanadium permeability test was performed on the composite film prepared in Example 1. A separator was sandwiched between two electrolytic cells, with the left electrolytic cell containing 1.5 M vanadium sulfate in 2 M sulfuric acid solution, and the right electrolytic cell containing 1.5 M magnesium sulfate in 2 M sulfuric acid solution. The concentration of vanadium ion in the right electrolytic cell was recorded for 7 days, and the calculated permeability of vanadium ion was 3.70×10$^{-3}$ mg/(L·min). Meanwhile, a comparison was made between the PVEImBr/PBI composite film in the disclosure and the currently commercial Nafion 115 separator, as shown in FIG. 6. After 7 days, the vanadium permeability of the composite film prepared in Example 1 was approximately ⅛ of that of the Nafion 115 separator, indicating that the disclosure achieves a lower vanadium permeability.

Figure 7:
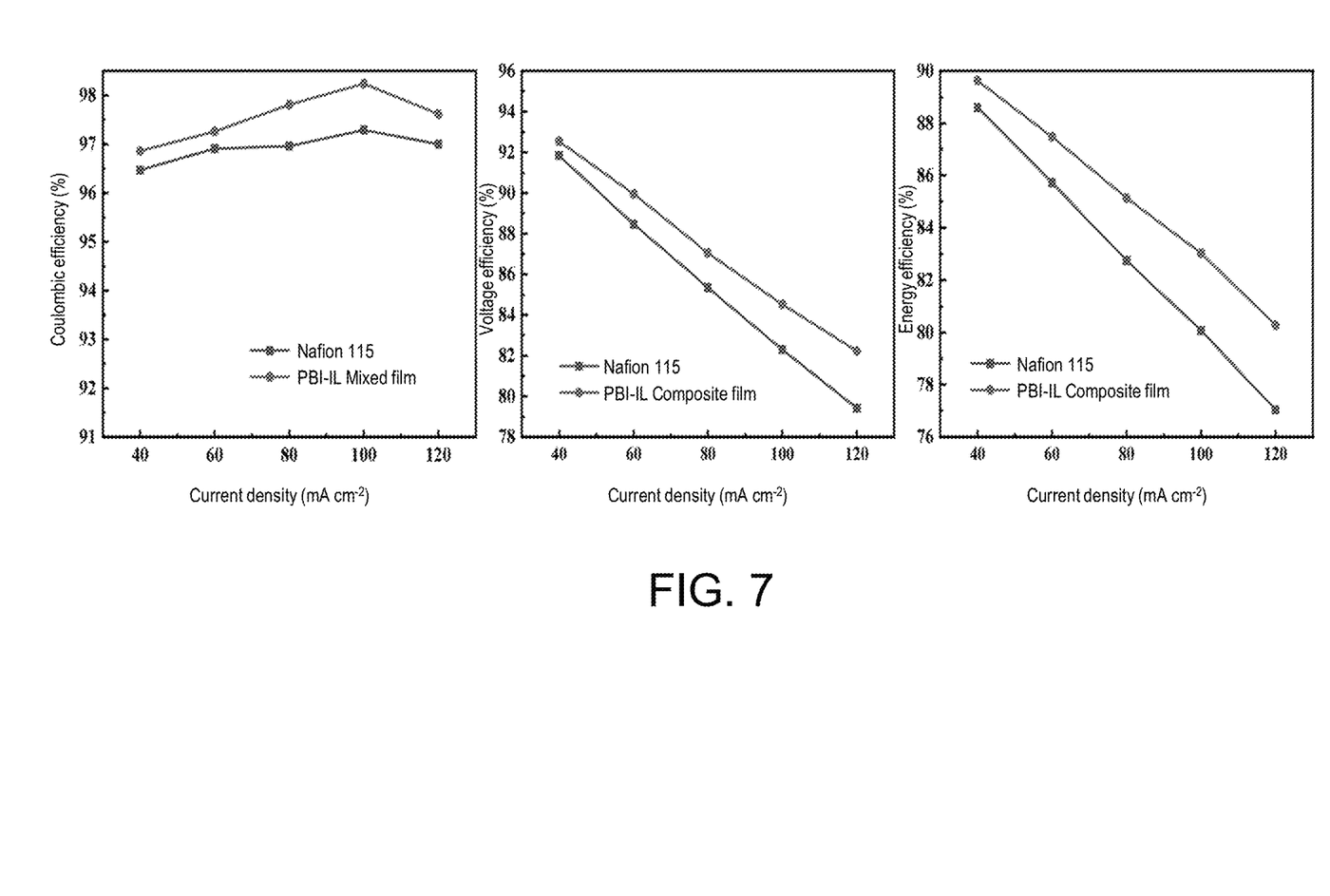
FIG. 7 is a comparison chart of battery efficiency at different current densities between a battery assembled by the irradiated PIL/PBI composite film in Example 1 and a commercial Nafion 115 separator, where (a) is a curve chart of Coulombic efficiency for both at different current densities, (b) is a curve chart of voltage efficiency for both at different current densities, and (c) is a curve chart of energy efficiency for both at different current densities.

The PIL/PBI composite film obtained after protonation treatment of the composite film from Example 1 had a swelling degree of 19%, and was assembled into a battery. The tests of the Coulombic efficiency, energy efficiency, and voltage efficiency of the battery with the PIL/PBI composite film were performed at 100 mA·cm$^{-2}$, in comparison with the currently commercial Nafion 115 separator, as shown in FIG. 7. In this embodiment, the obtained PIL/PBI composite film in the battery has Coulombic efficiency of 98.24%, energy efficiency of 80.27%, and voltage efficiency of 82.23% at 100 mA·cm$^{-2}$, showing superior electrochemical performance compared to the commercial Nafion 115 separator.

Example 2

A preparation method was the same as the preparation method in Example 1, except that the ionic liquid monomer was changed to 1-allyl-3-ethylimidazolium chloride, with other conditions remaining unchanged. The performance of the obtained PIL/PBI composite film was comparable to that of Example 1.

Example 3

A preparation method was the same as the preparation method in Example 1, except that the polymer was changed to poly[2,2'-(p-oxydiphenylene)-5,5'-benzimidazole] (OPBI), with other conditions remaining unchanged. The performance of the obtained PIL/PBI composite film was comparable to that of Example 1.

Example 4

A preparation method was the same as the preparation method in Example 1, except that the solvent was changed from DMAc to NMP, with other conditions remaining unchanged. The performance of the obtained PIL/PBI composite film was comparable to that of Example 1.

Comparative Example 1

A PBI solid powder was mixed with a 20 to 100% unsaturated double bond-containing ionic liquid solution (for example, a hydrophilic ionic liquid such as 1-vinyl-3-ethylimidazolium bromide or 1-allyl-3-ethylimidazolium chloride; a hydrophobic ionic liquid such as 1-vinyl-3-butylimidazolium tetrafluoroborate or 1-vinyl-3-octylimidazolium tetrafluoroborate). The mixture was co-irradiated by using an electron beam under conditions with an irradiation dose of 10 kGy to 300 kGy. After completion, the ionic liquid monomer and a homopolymer thereof generated under the irradiation condition were washed away by ethanol and water. By comparing the mass of the PBI base material, it was found that there was no change in mass, indicating that the unsaturated double bond-containing ionic liquid solution may not be grafted onto the PBI. Furthermore, a thermal gravimetric analysis of the PBI base material surface before and after irradiation grafting also shows that no ionic liquid component was successfully introduced onto the PBI base material.

Comparative Example 2

A PBI solid powder was irradiated by electron beam under nitrogen atmosphere at −20° C., with an irradiation dose of 10 kGy to 300 kGy. After irradiation, the aforementioned PBI powder monomer was added to a 20 to 100% unsaturated double bond-containing ionic liquid solution (for example, a hydrophilic ionic liquid such as 1-vinyl-3-ethylimidazolium bromide or 1-allyl-3-ethylimidazolium chloride; a hydrophobic ionic liquid such as 1-vinyl-3-butylimidazolium tetrafluoroborate or 1-vinyl-3-octylimidazolium tetrafluoroborate) with pre-deoxygenation and reacted at 40° C. to 60° C. for 24 hours. The ionic liquid monomer and the homopolymer thereof generated under irradiation conditions were washed away by ethanol and water. By comparing the mass change of the PBI base material before and after, it was found that the unsaturated double bond-containing ionic liquid solution may not be grafted onto the PBI. Furthermore, the thermal gravimetric analysis of the PBI base material surface before and after irradiation grafting also shows that no ionic liquid component was successfully introduced onto the PBI base material.

Comparative Examples 1 and 2 demonstrate that PBI is difficult to modify through irradiation. In other words, it is challenging to achieve grafting of ionic liquid onto the PBI through ionizing radiation, which is also the reason why the ionizing radiation is not chosen in the current preparation for the ionic liquid/polymer composite film with PBI as the base material. However, the disclosure breaks conventional thinking and solves the problem that the ionic liquid monomer and the PBI base material may not be directly grafted polymerized and introduced by ionizing radiation technology. By first achieving uniformly mixing and film laying of the ionic liquid film and the base material in a co-solvent, and then performing the irradiation on the solid film, the polymerization/cross-linking of the ionic liquid is achieved, ultimately resulting in the physical entanglement effect on the polymer molecular chain in the base material to form a composite film.

Compared to a solid-liquid grafting reaction or a liquid-liquid grafting reaction involving a liquid phase, the preparation for the composite film by using ionizing radiation technology in the solid state has a simpler and faster control process which is more suitable for industrial-scale production, and has prospects for industrial use.

The aforementioned embodiments all confirm that the composite films obtained through the disclosure have excellent performance, and the radiation reaction on the solid film proposed by the disclosure is simpler to control and more conducive to large-scale industrial production.

Those skilled in the art may easily understand that the above are merely preferred implementations of the disclosure and are not intended to limit the disclosure. Any modifications, equivalent substitutions, and improvements made within the spirit and principles of the disclosure should be included within the scope of protection of the disclosure.

What is claimed is:

1. A preparation method for an ionic liquid/polymer composite film, comprising:
   uniformly mixing a polymer base material with an unsaturated double bond-containing ionic liquid monomer by a good solvent to obtain a casting solution, wherein the polymer base material comprises at least one of polybenzimidazole (PBI) and a PBI derivative;
   flatly laying the casting solution on a substrate, and drying to remove the solvent to obtain a solid film;
   performing ionizing radiation on the solid film, utilizing the ionizing radiation to induce the ionic liquid monomer to form a polyionic liquid and a cross-linked product thereof in the base material, and generating a physical entanglement effect between a polyionic liquid molecular chain and a base material molecular chain to fix the ionic liquid component in the polymer base material to form a composite film.

2. The preparation method for the ionic liquid/polymer composite film according to claim 1, further comprising:
   washing and protonating the irradiated solid film to form an ionic liquid/polymer composite ionic exchange film.

3. The preparation method for the ionic liquid/polymer composite film according to claim 1, wherein the PBI derivative is at least one of poly[2,2'-(p-oxydiphenylene)-5,5'-benzimidazole], poly[2,2'-(p-sulfonyldiphenylene)-5,5'-benzimidazole], poly[2,5-benzimidazole], and fluorine-containing polybenzimidazole.

4. The preparation method for the ionic liquid/polymer composite film according to claim 1, wherein an anion of the ionic liquid monomer is at least one of tetrafluoroborate, bromide ion, chloride ion, or nitrate ion, and a cation of the ionic liquid monomer is double bond-containing vinyl imidazolium or allyl imidazolium.

5. The preparation method for the ionic liquid/polymer composite film according to claim 1, wherein a mass of the ionic liquid monomer is 10 to 200% of a mass of the polymer base material, preferably.

6. The preparation method for the ionic liquid/polymer composite film according to claim 1, wherein the good solvent comprises at least one of N,N-dimethylformamide, N,N-dimethylacetamide, dimethyl sulfoxide, and N-methyl pyrrolidone.

7. The preparation method for the ionic liquid/polymer composite film according to claim 1, wherein the polymer base material is further mixed with an inorganic nanoparticle, and the inorganic nanoparticle comprises at least one of graphene, mesoporous carbon, functionalized carbon nanotube, and two-dimensional transition metal carbide/nitride.

8. The preparation method for the ionic liquid/polymer composite film according to claim 1, wherein the ionizing radiation is any one of gamma ray radiation, electron beam radiation, or X-ray radiation, and an irradiation dose range of the ionizing radiation is 10 kGy to 300 kGy.

* * * * *